2 Sheets—Sheet 1.

S. HULL.
HARVESTER RAKE.

No. 89,867. Patented May 11, 1869.

Witnesses:

Inventor:

2 Sheets—Sheet 2.

S. HULL.
HARVESTER RAKE.

No. 89,867. Patented May 11, 1869.

Witnesses.

Inventor

United States Patent Office.

STEPHEN HULL, OF POUGHKEEPSIE, NEW YORK.

*Letters Patent No. 89,867, dated May 11, 1869.*

---

IMPROVEMENT IN HARVESTER-RAKES.

---

The Schedule referred to in these Letters Patent and making part of the same.

---

*To all whom it may concern:*

Be it known that I, STEPHEN HULL, of Poughkeepsie, in the county of Dutchess, and State of New York, have invented certain new and useful Improvements on Harvesters; and I do hereby declare that the following is a full, clear, and exact description thereof, reference being had to the accompanying drawings, making a part of this specification, in which—

Figure 1:
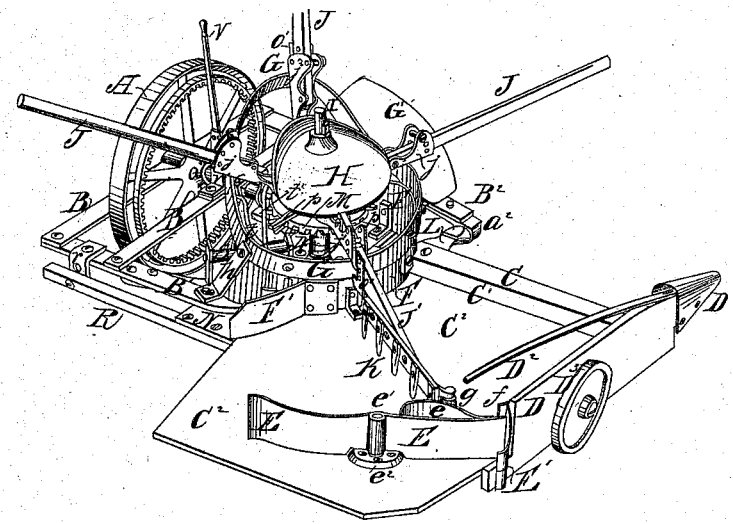

Figure 1, sheet 1, is a perspective view of the improved machine arranged as a reaper, with its self-raking and reeling attachment.

Figure 2:
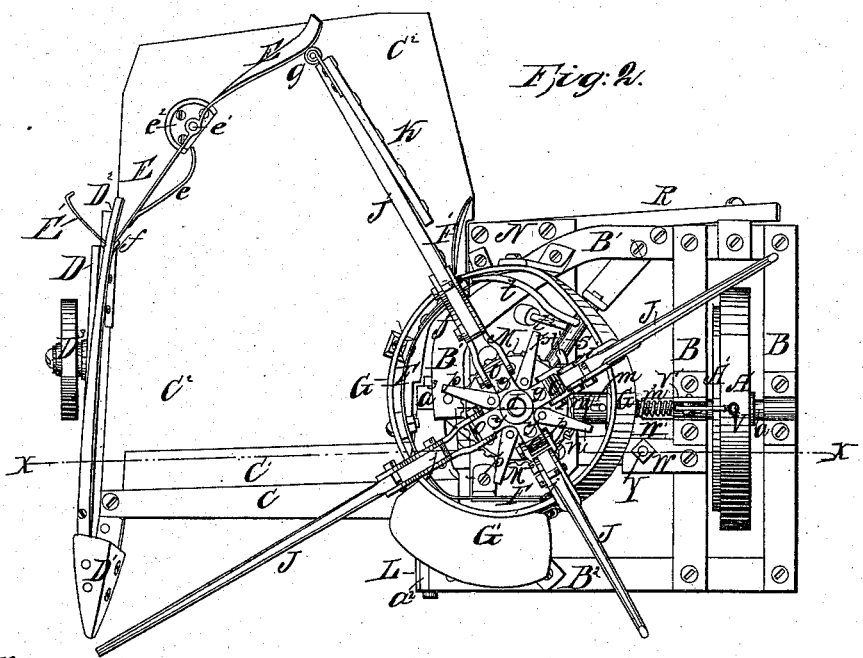

Figure 2, sheet 1, is a plan view of the machine, with the cam-plate, which holds the rake and reels down in position, removed.

Figure 3:
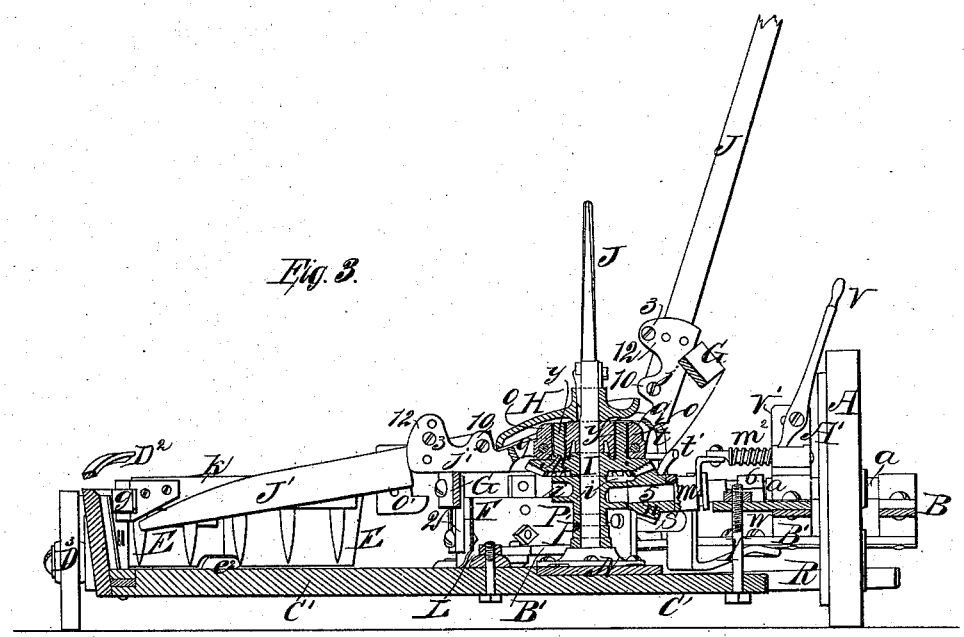

Figure 3, sheet 2, is a vertical section through the machine, taken in the course indicated by red line $2x$ in fig. 2.

Figure 4:
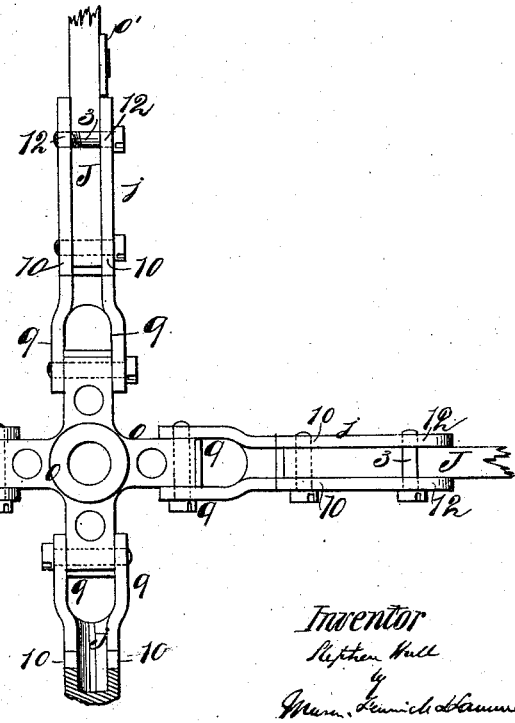

Figure 4, sheet 2, is an enlarged top view, showing the manner of attaching the rake and reels to the arms of their revolving hub.

Figure 5:
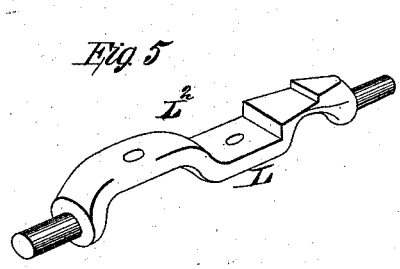

Figure 5, sheet 2, is a perspective view of the improved rocking bar, which is connected to the contracted inner ends of the main draught-frame.

Similar letters of reference indicate corresponding parts in the several figures.

This invention relates to certain novel improvements which are particularly applicable, though not altogether confined to the single driving and transporting-wheel, rigid finger-bar harvesters, having revolving raking and reeling-devices applied to them, for gathering in the standing grain to be cut, and delivering the cut grain from the platform in rear of the draught-frame.

The machine which I have illustrated in the accompanying drawings has a main driving and transporting-wheel applied to a draught-frame, which has two arms extending laterally from it, and connected at their ends to a rocking shoe.

To this shoe the finger-bar is rigidly secured, which finger-bar is thus allowed to vibrate freely, when the reaping-devices are all removed, and the machine is used as a mower.

When the machine is used as a reaper, the grain-platform and an intermediate rake and reel-supporting platform are rigidly secured to the draught-frame and finger-bar, together with the devices which operate the rake and reels. This renders the finger-bar rigid, so that the rake and its reel-arms can be driven by a short shaft connected directly to the axle of the driving-wheel, and so that the outer end of the platform and finger-bar can be sustained by a small wheel in rear of the outer divider.

The nature of my invention consists in a revolving hub, having radial arms formed on it, which is attached, by perpendicular studs, to the top of a bevel-spur wheel that is applied to the rake and reel-post, and in pivoting the jaws which carry the rake and reel-arms to the arms of said hub, so that the rake-arm, as well as the reel-arms, is free to receive vertical vibrations while revolving around the said reel-post, as will be hereinafter explained.

It also consists in the employment of a curved bar upon the outer part of the platform, which bar is so arranged as to serve the purpose of raising the reel or gathering-arms above the cut grain upon the platform, and sustaining these arms while sweeping around over the platform, as will be hereinafter explained.

Also, in the application, to a side-delivery platform, of a device which will operate in harmony with the rake, and compress the grain which is being raked off the platform, thereby allowing it to be delivered upon the ground in compact gavels, as will be hereinafter explained.

Also, in sustaining the large bevel-spur wheel, which carries the rake and reel-arms around a central post, upon a tubular bearing, which is placed upon said post, and provided with two or more bearings at different heights, for allowing the use of pinion-driving wheels of different diameters, so that the relative speeds of the main driving-wheel and large bevel-wheel can be readily changed at pleasure, for making gavels of different sizes, as will be hereinafter explained.

Also, in adapting the inner shoe or rocking bar to receive a beam, which is used for sustaining the finger-bar and platform, so as to allow the said beam to be brought close up to the rear edge of the finger-bar, and to be adjusted level with its top surface, as will be hereinafter explained.

Also, in the application, to the front part of the large cam-railway which encircles the rake and reel-post, of a short inclined rail or support, adapted to serve, in conjunction with adjustable pieces upon the rake and reel-arms, for the purpose of guiding these arms into the standing grain at any desired angle, as will be hereinafter explained.

Also, in providing revolving rake and reel-arms with a lifting-device which shall automatically lift the said arms perpendicularly, or nearly so, as they successively leave the point in their circuit where the gavels are discharged from the platform, as will be hereinafter explained.

To enable others skilled in the art to understand my invention, I will describe its construction and operation.

In the accompanying drawings—

A represents the driving and transporting-wheel, which has secured concentrically to its spokes an inside gear-wheel, A', used for driving the sickle.

This wheel A supports the draught-frame, which consists of two longitudinal bars, B B, secured at their ends to transverse bars or braces, B¹ B², that extend out laterally from the grain-side, and are provided, on their ends, with bearings, $a^2 a^3$, for receiving the rounded ends of a shoe or rocking bar, L.

The front bar, B², is parallel to the axis of the wheel A, but slightly depressed at its outer end, and the rear bar, B¹, is curved forward, and also depressed, so as to allow the shoe L to be brought near enough to the ground.

The two transverse bars B¹ B² have been fully described by me in my Letters Patent, August 18, 1868.

numbered 81,090. They serve as braces for sustaining the shoe L at a proper distance from the driving-wheel A, to allow the raking and reeling-devices to be arranged between the inner side of the grain-platform C² and said driving-wheel, as shown in the drawings.

The finger-bar C is rigidly secured, at its inner end, to the shoe L, and, at its outer end, to a piece which is secured to the outer end of a beam, C¹, lying just in rear of bar C.

This beam C¹ is secured to the shoe L at one point, and extends inward beneath a bracket, W, on frame-bar B, and is suspended from this bracket by a rod, Y, upon which a nut is screwed.

By turning said nut, the beam C¹ can be adjusted about the axis of motion of the shoe L.

Beam C¹ is fitted closely up to the rear edge of the finger-bar C, and is flush with its upper surface.

This is effected by making the shoe arched in rear of the recess, for receiving the finger-bar, as shown at L² in fig. 5.

To the beam C¹ the front edge of the platform C² is rigidly secured, and also the front end of an intermediate platform, N, which latter is arranged between the inner side of the grain-platform C² and the driving-wheel A.

The rear part of the platform is sustained upon and secured to a beam, R, which is secured, by an adjustable connection, to a pendant, r, upon the rear bar, B¹.

The rear end of the intermediate platform N is also sustained upon and secured to the rear beam, R, as shown in the drawings.

D¹ is the outer divider;

D, the platform-fender;

D³, the outer or grain-wheel; and

D², a curved rod, which is secured fast, at its front end, to the front end and upper edge of the fender D, and which extends backward and upward, so as to form a support for the reel or gathering-arms J as these arms sweep over the platform C²

This rod D² will raise the arms J as they sweep over the platform, and prevent them from interfering with the cut grain lying thereon.

Near the rear end of the grain-platform or receiver C², I have applied a fender, E, which is suitably curved, and pivoted, by a perpendicular stand-post, e', to the platform, so as to vibrate freely.

This fender has a curved cam-plate, e, secured to its front wing; and the front end of this wing is limited in its vibrations by the stops f and E', which are secured to the rear end of the fender D, as clearly shown in figs. 1 and 2.

This fender E is arranged obliquely across, or nearly across, the rear part of the platform C², so as to direct the grain which is being raked therefrom toward the inner side thereof.

As the rake K sweeps back over the platform, carrying with it the cut grain, a small anti-friction roller, g, on the outer end of this rake, will strike the cam-plate e, and force the rear wing of the fender E forward, so as to compress the grain between it and the rake. Then, as the rake continues to move around, the roller g will leave the cam-plate e, force back the fender, and deliver the compressed gavel upon the ground.

By this simple arrangement, each bundle of grain is compressed upon the grain-platform, so that it can be left in a compact mass upon the ground.

The intermediate platform N is designed to serve as the support for the rake and reel-post I, which is suitably secured to this platform, so as to rise perpendicularly, or nearly so, therefrom, to receive the rake and reel-carrying devices.

Upon this post is a tubular bearing, P, for one end of a driving-shaft, 5; and on top of this tubular bearing is a large bevel-spur wheel, M, shown in figs. 2 and 3, which wheel is free to turn around the post I, and is so turned by means of a pinion, n, that is placed loosely upon shaft 5, but engaged with it, at pleasure, by a sliding clutch, m.

The bearing P rests upon washers P', placed around shaft I, such washers, by being substituted by others, either thicker or thinner, effecting an accurate adjustment of the rake and reel-arms, with respect to the cam-rail and other adjuncts thereof.

Said bearing P is constructed with two sockets, i i, either one of which can be used at pleasure.

The socket i, which is represented as supporting the outer end of shaft 5, being farthest from the wheel M, will allow of the use of the largest pinion for turning this wheel, and the socket on the opposite side of the tube P, being nearest the wheel M, will allow of the use of a smaller pinion than the one shown.

By thus having two sockets i on one bearing-box, different sizes of pinions can be used upon shaft 5, without raising or depressing wheel M, and the rake and reel-arms can be made to sweep around faster or slower, according to the size of the gavels required.

To the sliding-clutch sleeve m, a yoke is attached, which is on one end of a sliding-spring rod, m², that has its bearing in a standard, V', on frame B.

By means of the band-lever V, which is pivoted to standard V', the operator can stop or start the rake and reel-arms at pleasure, while the machine is in motion.

The shaft 5 is connected, by a square-socketed coupling-box, 6, to the end of the axle a of the driving-wheel A.

The bevel-spur wheel M is constructed with four radial arms p p, projecting from its circumference, at equal distances apart; also with four studs, y y y y, rising perpendicularly from its top surface, and arranged concentrically around the axis of this wheel M, at equal distances apart.

On top of this wheel M is a hub, O, having four arms extending radially from it, and arranged at equal distances apart, as shown in figs. 2 and 4, to which arms the jaws j j', which carry the rake and reel-arms, are suitably pivoted, so as to have free vertical vibrations.

On top of the armed hub O is a large cam-plate, H, which is keyed or otherwise secured fast to the post I, and so shaped as to serve as a means for preventing the rake and reel-arms from rising out of proper position when they meet with the resistance of the grain.

Instead of the studs y, I may use a clutching-device on the hub of the bevel-wheel M, and on the hub of the device O, as a means of connection between these parts.

In the drawings, figs. 3 and 4 show clearly the form of the jaws j j'.

They are all constructed exactly alike, and each one is made of a single piece of metal, with two long pivoting-jaws 9 9, that receive between them one of the arms of the hub O, two pivoting-jaws 10, 10, that receive and have pivoted between them the end of a rake or reel-arm, and two segment-jaws 12, 12, which are perforated at different points, to receive a pin, 3, that limits the vibration of the rake or reel-arm, as the case may be, about its pivotal connection to the jaws.

It will thus be seen that each rake and reel-arm is allowed to vibrate in its jaw, independently of the vibration of its jaw.

J J J represent the three reel or gathering-arms, and J' represents the rake-arm, to which latter the rake-head K is attached, at a proper angle to move across the platform in a plane parallel to it, as shown in figs. 1 and 3.

Surrounding the rake and reel-post I is a cam-rail, G, which is suitably secured to the braces B¹ B², and also to a grain-guard, F.

This cam-rail is so shaped that its grain-side is depressed, and is parallel, or nearly so, to the plane of the platform $C^2$, and its opposite side rises, so as to elevate the rake and reel-arms nearly perpendicularly, as they sweep around on that side of the rake and reel-post next the driving-wheel A, as shown in figs. 1, 2, and 3.

The grain-guard or apron F and F' extends more than half around on the grain-side of the rake and reel-post, and is designed to prevent grain from getting within the space reserved for the rake and reel-gearing.

The portion F' of the grain-guard is secured to the main portion F, near the rear side thereof, and extends backward and inward, so as to properly direct the cut grain upon the ground, as it is raked off the platform $C^2$.

When the armed hub O, with rake and reel-arms attached to it, is placed upon the wheel M, and attached to the wheel by the studs $y$, passing through the four arms of this hub, and when the cam-plate H is secured down in place over the armed hub and over the long pivotal portions of the jaws $j\ j'$, as shown in figs. 1 and 3, the jaws $j\ j'$ will rest against the upper edge of the cam-rail G, and assume the different positions given to them by the peculiar curve of this rail.

To the front part of the cam-rail G, a plate or rail, G', is secured, in an inclined position, corresponding somewhat to the inclined edge of the rail G at this point; and to the rake and reel-arms, near the outer ends of the jaws $j\ j'$, adjustable pieces O' are attached, which extend downward, and sustain the rake and reel-arms upon said plate or rail G', while these arms are descending to press in the standing grain to be cut.

The object of this arrangement is to guide the rake and reel or gathering-arms into the standing grain at any proper height, according to the height of the grain.

In rear of the post I, and supported in suitable bearings, is a rock-shaft, S, having three arms, $t\ t^1\ t^2$, secured to it.

The arm $t$ rises from the shaft S, and is curved and extended toward the platform $C^2$, as shown in figs. 1 and 2, so that, as the rake and reel-arms are successively moved around, their jaws $j\ j'$ will pass from the cam-rail G upon the curved portion of this arm $t$.

The arm $t^1$ is arranged at such an angle with respect to the radial arms $p$, on wheel M, that, as these arms are moved around with their wheel, they will strike the arm $t^1$, and thereby lift arm $t$ and a rake or reel-arm which may be upon it, and leave such arm upon the cam-rail again at a more elevated point.

As soon as the arm $t^1$ is released from an arm, $p$, the weight which is on arm $t^2$ will return the arms $t\ t^1$ back to positions, ready for lifting the succeeding rake or reel-arm.

By this arrangement the rake-arm will be lifted suddenly and nearly perpendicularly from the buts of the grain in gavels, immediately the grain is deposited upon the ground, thus preventing the rake from scattering the grain.

This arrangement also operates to assist both the rake and reel-arms up the steep inclined plane at the rear terminus of the horizontal portion of the cam-rail G.

When the machine is moved along, and the clutch $m$ is in gear with the clutch-face on the hub of pinion-wheel $n$, the rake and reel-arms will be caused to revolve around the central fixed shaft I, and while revolving around this shaft, said arms will be vibrated about their pivotal or hinged connections, with the radial arms O of the revolving hub resting on wheel M.

As the rake is moved over the platform $C^2$, to rake off the cut grain, the horizontal portion of the cam-rail G will allow this rake to move parallel to this platform, and, at the moment the compressed gavel drops from the platform, the arm $t$ will lift it quickly free from the gavel just dropped.

The rake then proceeds forward to commence another raking-stroke, and as it descends in front of the finger-bar, the inclined plate or rail G' will sustain it by its adjustable bearing-piece O', and cause it to sweep over the top of the standing grain, until the rake reaches a point to commence operation upon the cut grain, when piece O' will leave the plate or rail G', and allow the rake to drop suddenly into raking position.

The adjustable pieces O', on the reel or gathering-arms, will operate to cause these arms to descend more or less perpendicularly into the standing grain.

As these arms J sweep around over the platform, the rod $D^2$ will hold them up free from the cut grain.

Having described my invention,

What I claim as new, and desire to secure by Letters Patent, is—

1. The bevel-wheel M, constructed with pins $y$, or their equivalents, extending up from the top of the bevel-wheel, whereby the armed hub O can be rigidly connected to the bevel-wheel, by simply setting it down upon said wheel, and also whereby it can be disconnected therefrom by simply lifting it up from said wheel, substantially as described.

2. The vibrating grain-compresser E, applied upon a grain-platform, and operated by the rake during the act of raking off the grain, said compresser being constructed to operate substantially as described.

3. The tubular journal-box P, constructed with two bearings $i\ i$, and adapted to serve the purposes described.

4. The construction of the shoe L, with an arched recess, $L^2$, substantially as described.

5. The construction and arrangement of the guide-plate G' of the cam-rail G and the adjustable bearing-pieces O' of the rake or reel-arms, all in the manner and for joint operation, substantially as described.

6. The rod $D^2$, extending backward and upward from the rear of the outer divider $D^1$, as described and shown, arranged with a combined rake and reel, which has arms of different lengths, so that the rake-arms, during their revolution, will move clear of the rod $D^2$, and the reel-arms will be lifted by said rod, substantially as specified.

7. Rocking-shaft S, constructed, arranged, and applied substantially as described, and the devices $p\ t\ t^1\ t^2$, or the equivalents thereof, in combination with the ordinary cam-rail G, and with the independently-hinged rake and reel-arms of a combined revolving rake and reel, for the purpose set forth.

8. The supporting-beam $C^1$, extended inward, and suspended from the draught-frame by means of an adjustable connection, Y, said beam supporting the platform and bearings of the finger-beam, and being secured to the shoe L, substantially as described.

9. The arrangement and combination of the washers P', hub P, shaft I, bevel-wheel M, hub O, cam-plate H, cam-rail G, and independently-hinged rake and reel-arms, substantially in the manner shown and described.

10. The device $p$, or its equivalent, applied to the crown-wheel M, or hub of the rake and reel, for automatically operating the device $t$, which suddenly elevates the rake and reel-arms, substantially as described

STEPHEN HULL.

Witnesses:
ROBT. N. PALMER,
C. S. VAN WYCK.